(12) United States Patent
Cai

(10) Patent No.: US 12,710,645 B2
(45) Date of Patent: Aug. 18, 2026

(54) WAVEGUIDE-BASED BEACON CONFIGURATION FOR TRACKING

(71) Applicant: Meta Platforms Technologies, LLC, Menlo Park, CA (US)

(72) Inventor: Jinlin Cai, Shanghai (CN)

(73) Assignee: Meta Platforms Technologies, LLC, Menlo Park, CA (US)

( * ) Notice: Subject to any disclaimer, the term of this patent is extended or adjusted under 35 U.S.C. 154(b) by 230 days.

(21) Appl. No.: 18/616,759

(22) Filed: Mar. 26, 2024

(65) Prior Publication Data

US 2024/0369830 A1 Nov. 7, 2024

Related U.S. Application Data

(60) Provisional application No. 63/464,153, filed on May 4, 2023.

(51) Int. Cl.

| | |
|---|---|
| ***G02B 27/00*** | (2006.01) |
| ***F21V 8/00*** | (2006.01) |
| ***G02B 6/34*** | (2006.01) |
| ***G02B 27/01*** | (2006.01) |

(52) U.S. Cl.
CPC ....... *G02B 27/0093* (2013.01); *G02B 6/0015* (2013.01); *G02B 6/34* (2013.01); *G02B 27/0172* (2013.01)

(58) Field of Classification Search
CPC .... G02B 27/0093; G02B 6/0015; G02B 6/34; G02B 27/0172
USPC .......................................... 359/630; 345/7–9
See application file for complete search history.

(56) References Cited

U.S. PATENT DOCUMENTS

| | | | |
|---|---|---|---|
| 7,215,322 | B2 | 5/2007 | Genc et al. |
| 8,399,819 | B2 | 3/2013 | Madhani et al. |
| 10,057,953 | B2 | 8/2018 | Wimmer et al. |
| 11,451,762 | B2 | 9/2022 | Zhang et al. |

FOREIGN PATENT DOCUMENTS

WO WO-2022235250 A1 * 11/2022 ............ G06F 33/011

OTHER PUBLICATIONS

"ROHM Expands Its Miniature PICOLED™ Lineup: Power-Saving Infrared LED for VR/MR/AR Applications," Jan. 28, 2021, 1 page, Retrieved from the Internet URL: https://www.krom.com.tw/news1-370-lang1.html.

* cited by examiner

*Primary Examiner* — William Choi
(74) *Attorney, Agent, or Firm* — McDermott Will & Schulte LLP

(57) ABSTRACT

Waveguide-based beacon configurations for tracking, for example, virtual reality (VR) controllers, are disclosed. In some implementations, a device may include a light emitting diode, a waveguide, and an optical element. The waveguide may be formed within a frame of the device for a virtual reality headset. The optical element may be configured to couple a light from the light emitting diode into the wave-guide. The waveguide may be configured to emit at least a portion of the light out of the waveguide as multiple beacons for tracking an orientation and a displacement of the device.

20 Claims, 13 Drawing Sheets

WAVEGUIDE-BASED BEACON CONFIGURATION FOR TRACKING

CROSS-REFERENCE TO RELATED APPLICATIONS

The present disclosure is related and claims priority under 35 U.S.C. § 119(e) to U.S. Prov. Appln. No. 63/464,153, entitled WAVEGUIDE-BASED BEACON CONFIGURATION FOR TRACKING VR CONTROLLERS to Jinlin Cai, filed on May 4, 2023, the contents of which are hereby incorporated by reference in their entirety, for all purposes.

TECHNICAL FIELD

The present disclosure generally relates to artificial reality systems, and more particularly to waveguide-based beacon configurations for tracking virtual reality (VR) controllers.

BACKGROUND

Conventionally, artificial reality, extended reality, or extra reality (collectively, "XR") is a form of reality that has been adjusted in some manner before presentation to a user, which may include, e.g., VR, augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality.

Virtual reality systems may provide immersive experiences for gaming, training, and various simulations. These systems often include headsets and handheld controllers, which may be tracked to translate user movements into the virtual environment. Traditional tracking methods may involve the use of multiple infrared light-emitting diodes arranged on the controllers, which may be detected by cameras within the headset. The spatial arrangement of these infrared light-emitting diodes may be crucial for accurate tracking, as it allows the system to determine the controller's position and orientation. However, the complexity of integrating multiple infrared light-emitting diodes, along with the necessary flex circuits, connectors, and control electronics, may add to the cost and design challenges of controllers.

BRIEF SUMMARY

The subject disclosure provides for systems and methods for artificial reality systems. Some implementations may support a virtual reality system that may provide a user with a more immersive and interactive experience. The use of a single light source may simplify the design and potentially reduce the cost and complexity of manufacturing the controllers. The flexibility in the design of the light guide may allow for a variety of controller shapes and sizes, which may cater to different user preferences and ergonomic requirements. The system may be capable of precise tracking without the need for multiple light sources, which may lead to a reduction in power consumption and may increase the battery life of wireless controllers. The tracking system may be robust against occlusion since the light guide may emit multiple beacons, ensuring that at least some beacons remain visible to the headset's cameras at all times. This may result in fewer tracking errors and a smoother virtual reality experience.

One aspect of the disclosure relates to a device. The device may include a light emitting diode, a waveguide, and an optical element. The waveguide may be formed within a frame of the device for a virtual reality headset. The optical element may be configured to couple a light from the light emitting diode into the waveguide. The waveguide may be configured to emit at least a portion of the light out of the waveguide as multiple beacons for tracking an orientation and a displacement of the device.

Another aspect of the disclosure relates to a controller for a user interface in a virtual reality headset. The controller may include a handling feature, a frame, and a device. The handling feature may provide a grip for a user of the virtual reality headset. The frame may support multiple beacons for tracking the controller by the virtual reality headset. The device may include the beacons within the frame. The device may include a light emitting diode, a waveguide formed within a controller for a virtual reality headset, and an optical element configured to couple a light from the light emitting diode into the waveguide. The waveguide may be configured to emit at least a portion of the light out of the waveguide as multiple beacons for tracking an orientation and a displacement of the controller.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
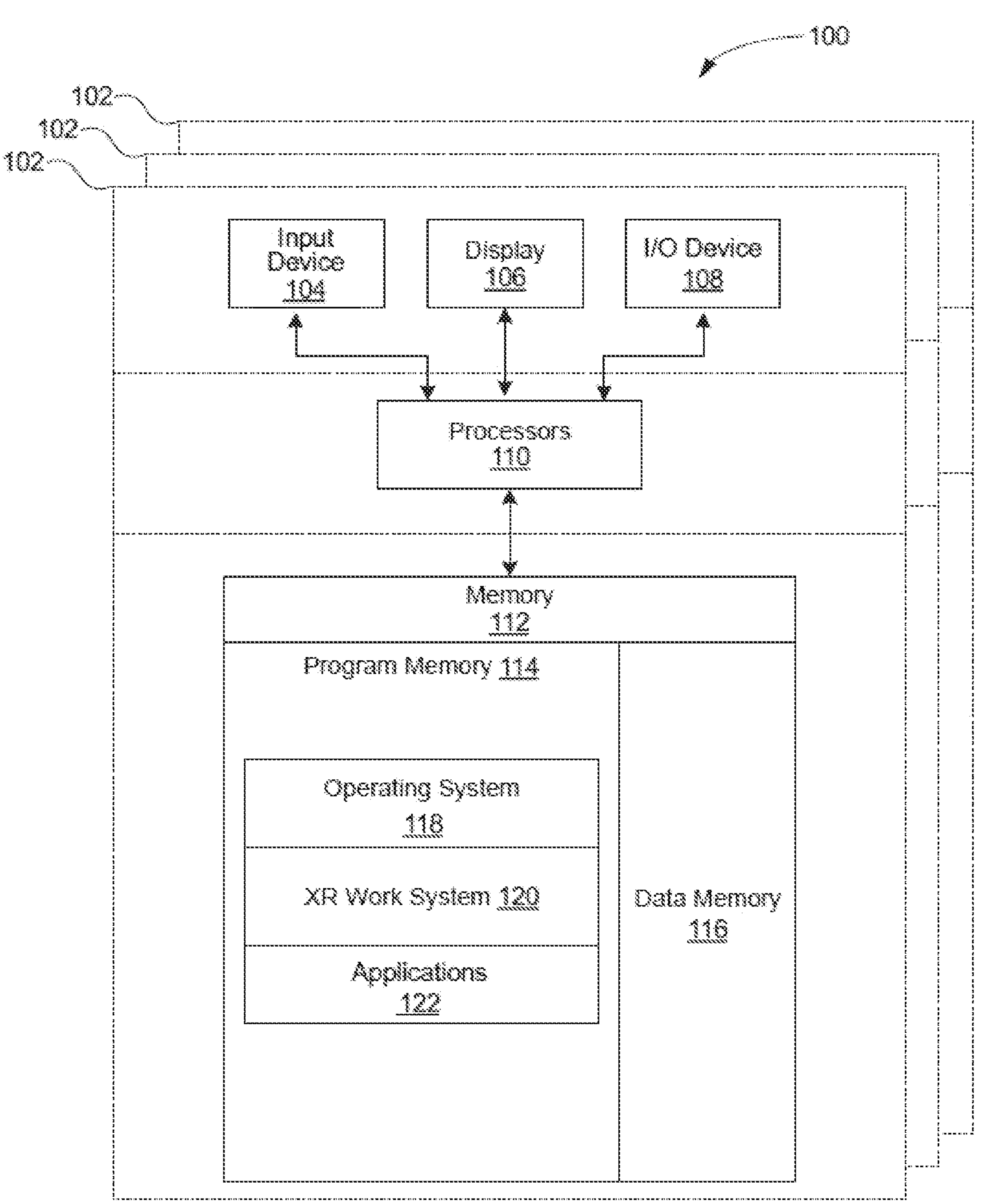
FIG. 1 is a block diagram illustrating an overview of devices on which some implementations of the disclosed technology can operate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Embodiments of the disclosed technology may include or be implemented in conjunction with an artificial reality system. Artificial reality, extended reality, or extra reality (collectively, "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some implementations, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. AR also refers to systems where light entering a user's eye is partially generated by a computing system and partially composes light reflected off objects in the real world. For example, an AR headset could be shaped as a pair of glasses with a pass-through display, which allows light from the real world to pass through a waveguide that simultaneously emits light from a projector in the AR headset, allowing the AR headset to present virtual objects intermixed with the real objects the user can see. The AR headset may be a block-light headset with video pass-through. "Artificial reality," "extra reality," or "XR," as used herein, refers to any of VR, AR, MR, or any combination or hybrid thereof.

Several implementations are discussed below in more detail in reference to the figures. FIG. 1 is a block diagram of a device operating environment 100 with which aspects of the subject technology can be implemented. The device operating environment can comprise hardware components of a computing system 100 that can create, administer, and provide interaction modes for a shared artificial reality environment (e.g., gaming artificial reality environment) such as for individual control of audio (e.g., switching audio sources) via XR elements and/or real-world audio elements. The interaction modes can include different audio sources or channels for each user of the computing system 100. Some of these audio channels may be spatialized or non-spatialized. In various implementations, the computing system 100 can include a single computing device or multiple computing devices 102 that communicate over wired or wireless channels to distribute processing and share input data.

In some implementations, the computing system 100 can include a stand-alone headset capable of providing a computer created or augmented experience for a user without the need for external processing or sensors. In other implementations, the computing system 100 can include multiple computing devices 102 such as a headset and a core processing component (such as a console, mobile device, or server system) where some processing operations are performed on the headset and others are offloaded to the core processing component. Example headsets are described below in relation to FIGS. 2A-2B. In some implementations, position and environment data can be gathered only by sensors incorporated in the headset device, while in other implementations, one or more of the non-headset computing devices 102 can include sensor components that can track environment or position data, such as for implementing computer vision functionality. Additionally or alternatively, such sensors can be incorporated as wrist sensors, which can function as a wrist wearable for detecting or determining user input gestures. For example, the sensors may include inertial measurement units (IMUs), eye tracking sensors, electromyography (e.g., for translating neuromuscular signals to specific gestures), time of flight sensors, light/optical sensors, and/or the like to determine the input gestures, how user hands/wrists are moving, and/or environment and position data.

The computing system 100 can include one or more processor(s) 110 (e.g., central processing units (CPUs), graphical processing units (GPUs), holographic processing units (HPUs), etc.). The processors 110 can be a single processing unit or multiple processing units in a device or distributed across multiple devices (e.g., distributed across two or more of computing devices 102). The computing system 100 can include one or more input devices 104 that provide input to the processors 110, notifying them of actions. The actions can be mediated by a hardware controller that interprets the signals received from the input device 104 and communicates the information to the processors 110 using a communication protocol. As an example, the hardware controller can translate signals from the input devices 104 to render audio, motion, or other signal-controlled features in the shared XR environment. Each input device 104 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, and/or other user input devices.

The processors 110 can be coupled to other hardware devices, for example, with the use of an internal or external bus, such as a PCI bus, SCSI bus, wireless connection, and/or the like. The processors 110 can communicate with a hardware controller for devices, such as for a display 106. The display 106 can be used to display text and graphics. In some implementations, the display 106 includes the input device as part of the display, such as when the input device is a touchscreen or is equipped with an eye direction monitoring system. In some implementations, the display is separate from the input device. Examples of display devices include an LCD display screen, an LED display screen, a projected, holographic, or augmented reality display (such as a heads-up display device or a head-mounted device), and/or the like. Other I/O devices 108 can also be coupled to the processor, such as a network chip or card, video chip or card, audio chip or card, USB, firewire or other external device, camera, printer, speakers, CD-ROM drive, DVD drive, disk drive, etc.

The computing system 100 can include a communication device capable of communicating wirelessly or wire-based with other local computing devices 102 or a network node. The communication device can communicate with another device or a server through a network using, for example, TCP/IP protocols. The computing system 100 can utilize the communication device to distribute operations across multiple network devices. For example, the communication device can function as a communication module. The communication device can be configured to transmit or receive audio signals.

The processors 110 can have access to a memory 112, which can be contained on one of the computing devices 102 of the computing system 100 or can be distributed across one of the multiple computing devices 102 of the computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 112 can include program memory 114 that stores programs and software, such as an operating system 118, XR work system 120, and other application programs 122 (e.g., XR games). The memory 112 can also include data memory 116 that can include information to be provided to the program memory 114 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and/or the like.

Figure 2A:
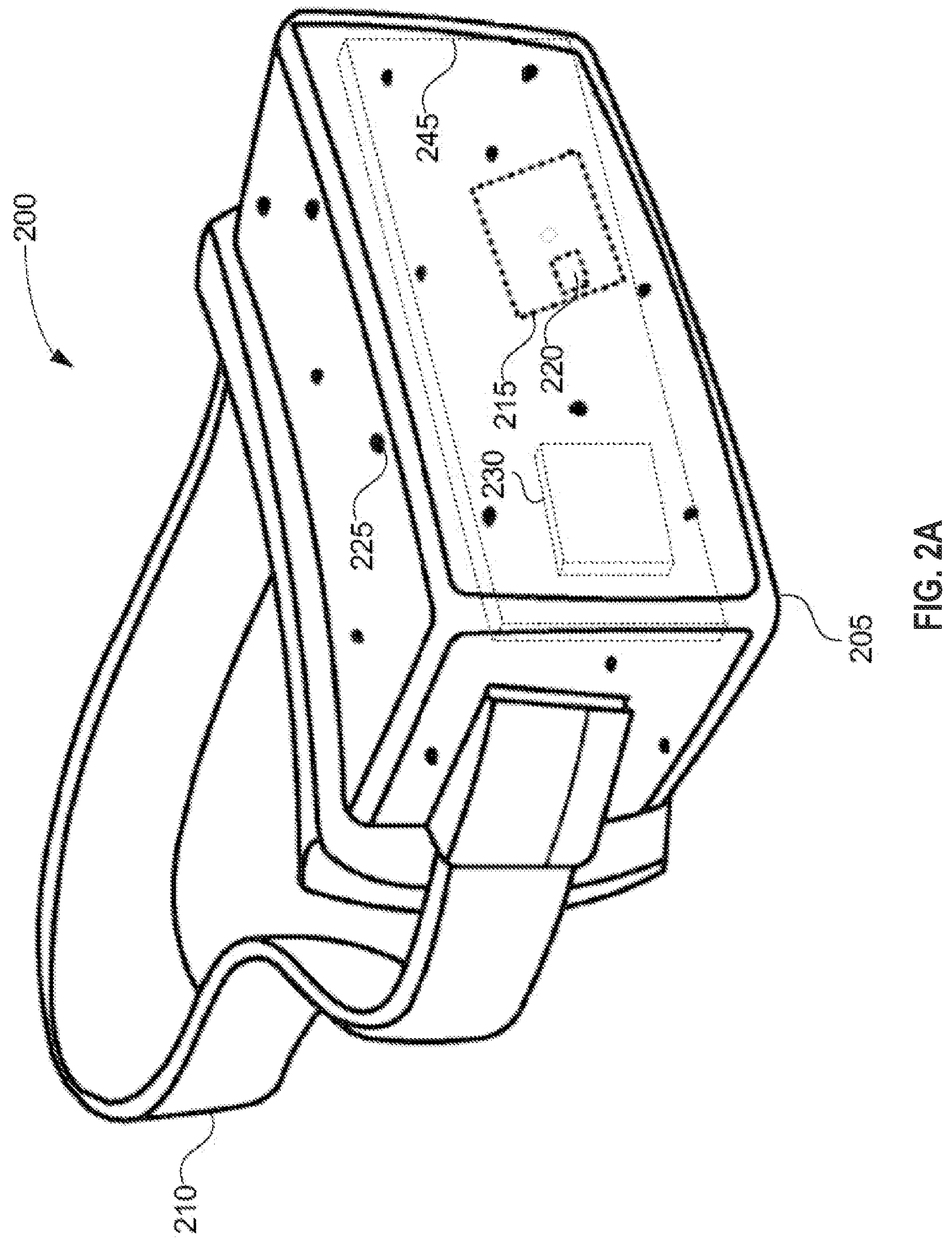
FIG. 2A is a wire diagram of a virtual reality head-mounted display (HMD), in accordance with one or more implementations.
Figure 2B:
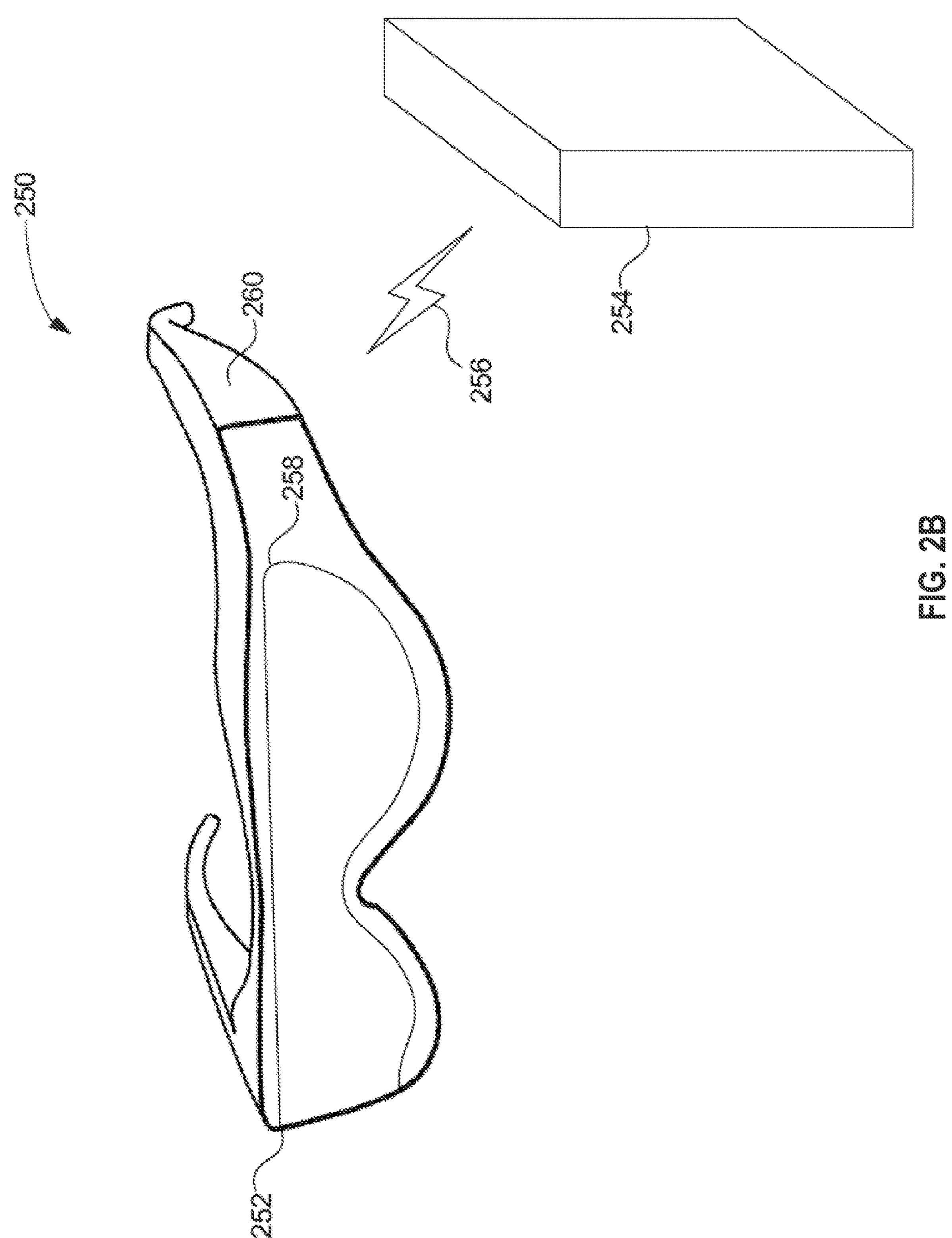
FIG. 2B is a wire diagram of a mixed reality HMD system which includes a mixed reality HMD and a core processing component, in accordance with one or more implementations.

FIGS. 2A-2B are diagrams illustrating virtual reality headsets, according to certain aspects of the present disclosure. FIG. 2A is a diagram of a virtual reality head-mounted display (HMD) 200. The HMD 200 includes a front rigid body 205 and a band 210. The front rigid body 205 includes one or more electronic display elements such as an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF), six degrees of freedom (6DoF), etc. For example, the locators 225 can emit infrared light beams which create light points on real objects around the HMD 200. As another example, the IMU 215 can include, e.g., one or more accelerometers, gyroscopes, magnetometers, other non-camera-based position, force, or orientation sensors, or combinations thereof. One or more cameras (not shown) integrated with the HMD 200 can detect the light points, such as for a computer vision algorithm or module. The compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof. The electronic display 245 can be coupled with an audio component, such as sending and receiving output from various other users of the XR environment wearing their own XR headsets, for example. The audio component can be configured to host multiple audio channels, sources, or modes.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

FIG. 2B is a diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by the link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc. The frame 260 or another part of the mixed reality HMD 252 may include an audio electronic component such as a speaker. The speaker can output audio from various audio sources, such as a phone call, VOIP session, or other audio channel. The electronic components may be configured to implement audio switching based on user gaming or XR interactions.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects. For example, the HMD system 250 can track the motion and position of the user's wrist movements as input gestures for performing XR navigation. As an example, the HMD system 250 may include a coordinate system to track the relative positions of various XR objects and elements in a shared artificial reality environment.

Figure 2C:
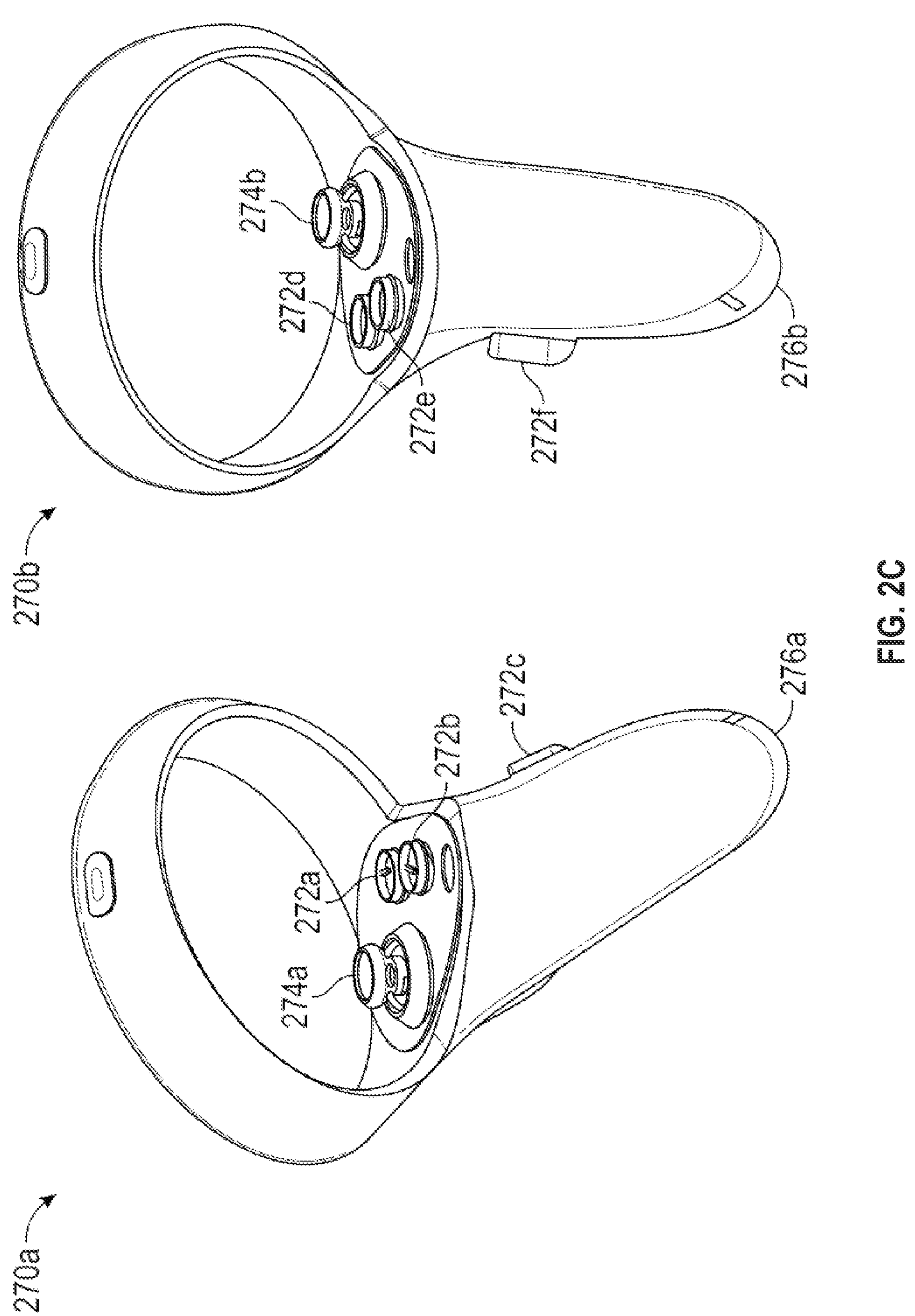
FIG. 2C illustrates controllers that a user can hold in one or both hands to interact with an artificial reality environment presented by the HMDs of FIGS. 2A and 2B, in accordance with one or more implementations.

FIG. 2C illustrates controllers 270*a*-270*b*, which, in some implementations, a user can hold in one or both hands to interact with an artificial reality environment presented by the HMD 200 and/or HMD 250. The controllers 270*a*-270*b* can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. For example, the compute units 230 can use the monitored hand positions to implement navigation and scrolling via the hand positions and motions of the user, such as to enable a high fiving motion in XR.

The controllers 270*a*-270*b* can also include various buttons (e.g., buttons 272*a-f*) and/or joysticks (e.g., joysticks 274*a-b*), which a user can actuate to provide input and interact with objects. As discussed below, controllers 270*a*-270*b* can also have tips 276*a* and 276*b*, which, when in scribe controller mode, can be used as the tip of a writing implemented in the artificial reality environment. In various implementations, the HMD 200 or 250 can also include additional subsystems, such as a hand tracking unit, an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. Such camera-based hand tracking can be referred to as computer vision, for example. Sensing subsystems of the HMD 200 or 250 can be used to define motion (e.g., user hand/wrist motion) along an axis (e.g., three different axes).

Figure 3:
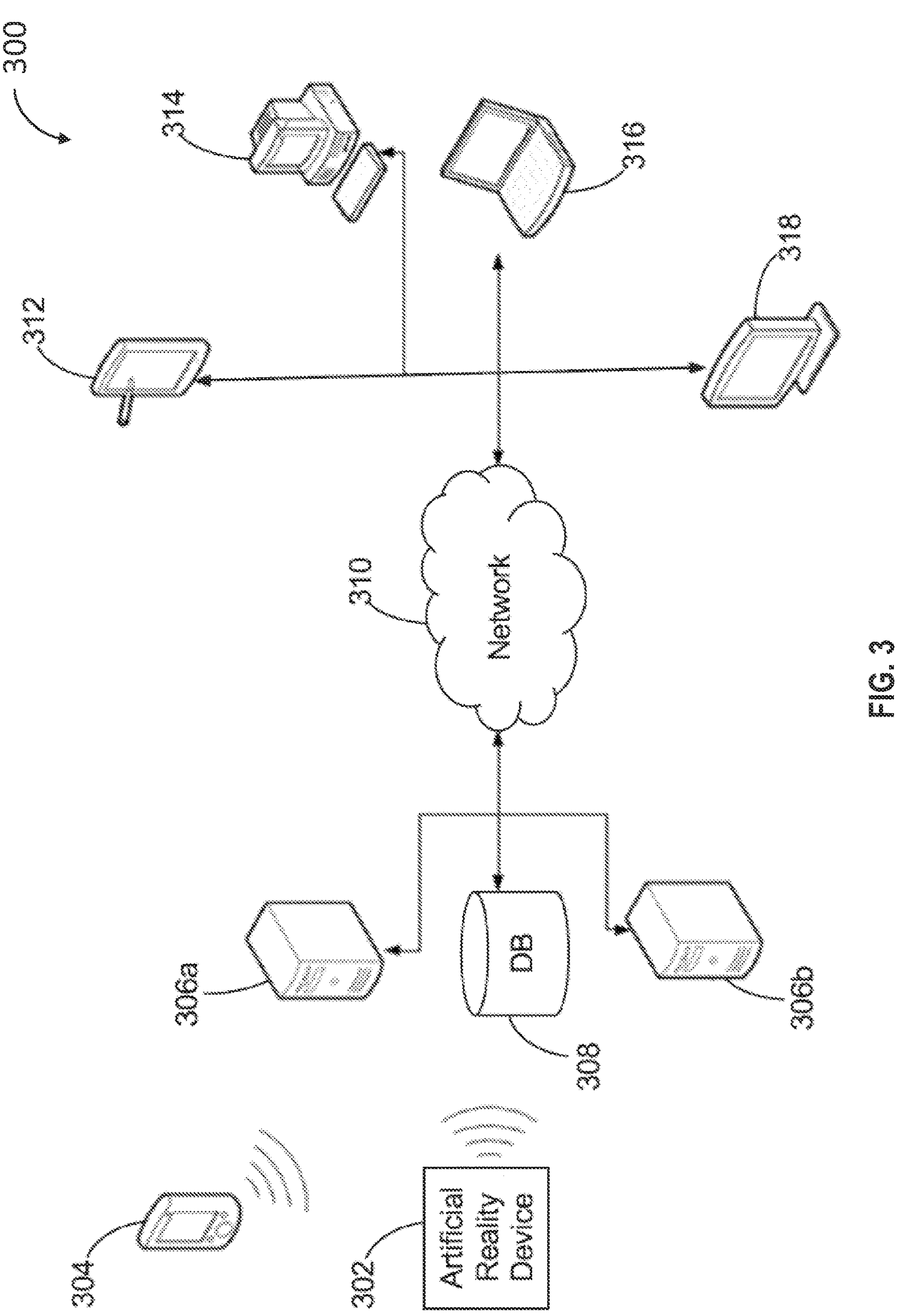
FIG. 3 is a block diagram illustrating an overview of an environment in which some implementations of the disclosed technology can operate.

FIG. 3 is a block diagram illustrating an overview of an environment 300 in which some implementations of the disclosed technology can operate. The environment 300 can include one or more client computing devices, such as artificial reality device 302, mobile device 304, tablet 312, personal computer 314, laptop 316, desktop 318, and/or the like. The artificial reality device 302 may be the HMD 200, HMD system 250, a wrist wearable, or some other XR device that is compatible with rendering or interacting with an artificial reality or virtual reality environment. The artificial reality device 302 and mobile device 304 may communicate wirelessly via the network 310. In some implementations, some of the client computing devices can be the HMD 200 or the HMD system 250. The client computing devices can operate in a networked environment using logical connections through network 310 to one or more remote computers, such as a server computing device.

In some implementations, the environment 300 may include a server such as an edge server which receives client requests and coordinates fulfillment of those requests through other servers. The server may include server computing devices 306*a*-306*b*, which may logically form a single server. Alternatively, the server computing devices 306*a*-306*b* may each be a distributed computing environment encompassing multiple computing devices located at the same or at geographically disparate physical locations. The client computing devices and server computing devices 306*a*-306*b* can each act as a server or client to other server/client device(s).

The server computing devices 306*a*-306*b* can connect to a database 308 or can comprise its own memory. Each server computing devices 306*a*-306*b* can correspond to a group of servers, and each of these servers can share a database or can have their own database. The database 308 may logically form a single unit or may be part of a distributed computing environment encompassing multiple computing devices that are located within their corresponding server, located at the same, or located at geographically disparate physical locations.

The network 310 can be a local area network (LAN), a wide area network (WAN), a mesh network, a hybrid network, or other wired or wireless networks. The network 310 may be the Internet or some other public or private network. Client computing devices can be connected to network 310 through a network interface, such as by wired or wireless communication. The connections can be any kind of local, wide area, wired, or wireless network, including the network 310 or a separate public or private network. In some implementations, the server computing devices 306*a*-306*b* can be used as part of a social network such as implemented via the network 310. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

In some tracking systems, the controllers may include a set of markers disposed on their surface to be tracked by external cameras. The markers on the controllers are mostly adapted with infrared light-emitting diode strings, which may apply to various virtual reality headsets. The infrared light-emitting diode string may comprise a number of infrared light-emitting diode light sources, light-emitting diode flex, light-emitting diode direct current-boost chip, and light-emitting diode current sink chip, which may increase the bill of materials cost and may bring complexity to the electrical engineering design. Moreover, the infrared light-emitting diode flex may not be easy to mount inside the controller and may be easy to be scratched, normally needing a specially designed base to hold it or glue to stick it.

The subject disclosure provides for systems and methods for artificial reality systems. Some implementations may support a virtual reality system that may provide a user with a more immersive and interactive experience. The use of a single light source may simplify the design and potentially reduce the cost and complexity of manufacturing the controllers. The flexibility in the design of the light guide may allow for a variety of controller shapes and sizes, which may cater to different user preferences and ergonomic requirements. The system may be capable of precise tracking without the need for multiple light sources, which may lead to a reduction in power consumption and may increase the battery life of wireless controllers. The tracking system may be robust against occlusion since the light guide may emit multiple beacons, ensuring that at least some beacons remain visible to the headset's cameras at all times. This may result in fewer tracking errors and a smoother virtual reality experience.

Implementations described herein address the aforementioned shortcomings and other shortcomings by providing a simplified tracking system for virtual reality controllers. This may involve the use of a single high-power infrared light-emitting diode in conjunction with an optical fiber system. This single light-emitting diode may replace the traditional array of multiple infrared light-emitting diodes, thereby streamlining the electrical system. The optical fiber system may be responsible for distributing the infrared light to the controller's surface, where it is needed for tracking. By leveraging the properties of optical fibers, the light can be divided and transmitted efficiently to the required locations on the controller.

The benefits of this approach may be multifold. Firstly, the reduction in the number of light-emitting diodes and associated electronic components may lead to significant cost savings. The optical fibers used are customizable and can be produced at a low cost due to mature industry technology. Secondly, the design may eliminate the need for complex flex circuits and connectors, simplifying the assembly process and reducing the risk of damage during manufacturing. This approach not only may reduce the overall cost of virtual reality controllers but also offers greater design flexibility, as the optical fibers can be shaped and routed within the controller without the constraints imposed by traditional light-emitting diode arrangements.

According to some implementations, a system for tracking hand movements and orientation in a virtual reality environment may include a special type of light guide. This light guide may be shaped to fit within the frame of a virtual reality controller, which is a device held by users to interact with the virtual environment. The light guide may have features on its surface, such as indentations or raised areas, that allow light to be emitted at specific points along its length. These points of light may serve as beacons that can be detected by cameras within the virtual reality headset to determine the position and movement of the controller.

The system may use a single light source, such as a light-emitting diode, which is a component that converts electrical energy into light. This light source may be coupled with an optical element, which is a part that directs light into the light guide. The light guide may be made of a material that allows light to travel through it, and the light may exit the guide at the points where the surface features are located. These emitted lights may then be used as reference points by the virtual reality system to track the controller's location and how it is being moved or rotated by the user.

In some implementations, the light guide may take various shapes to conform to different designs of virtual reality controllers. It may be cylindrical, ring-shaped, or have any arbitrary shape that suits the controller's form factor. The light guide may be made flexible to allow for easy installation within the controller's frame. The system may include components such as an accelerometer for detecting the controller's orientation and a communications module for sending data to the virtual reality headset. These components may work together to provide a comprehensive tracking system that enhances the user's interaction with the virtual environment.

Figure 4:
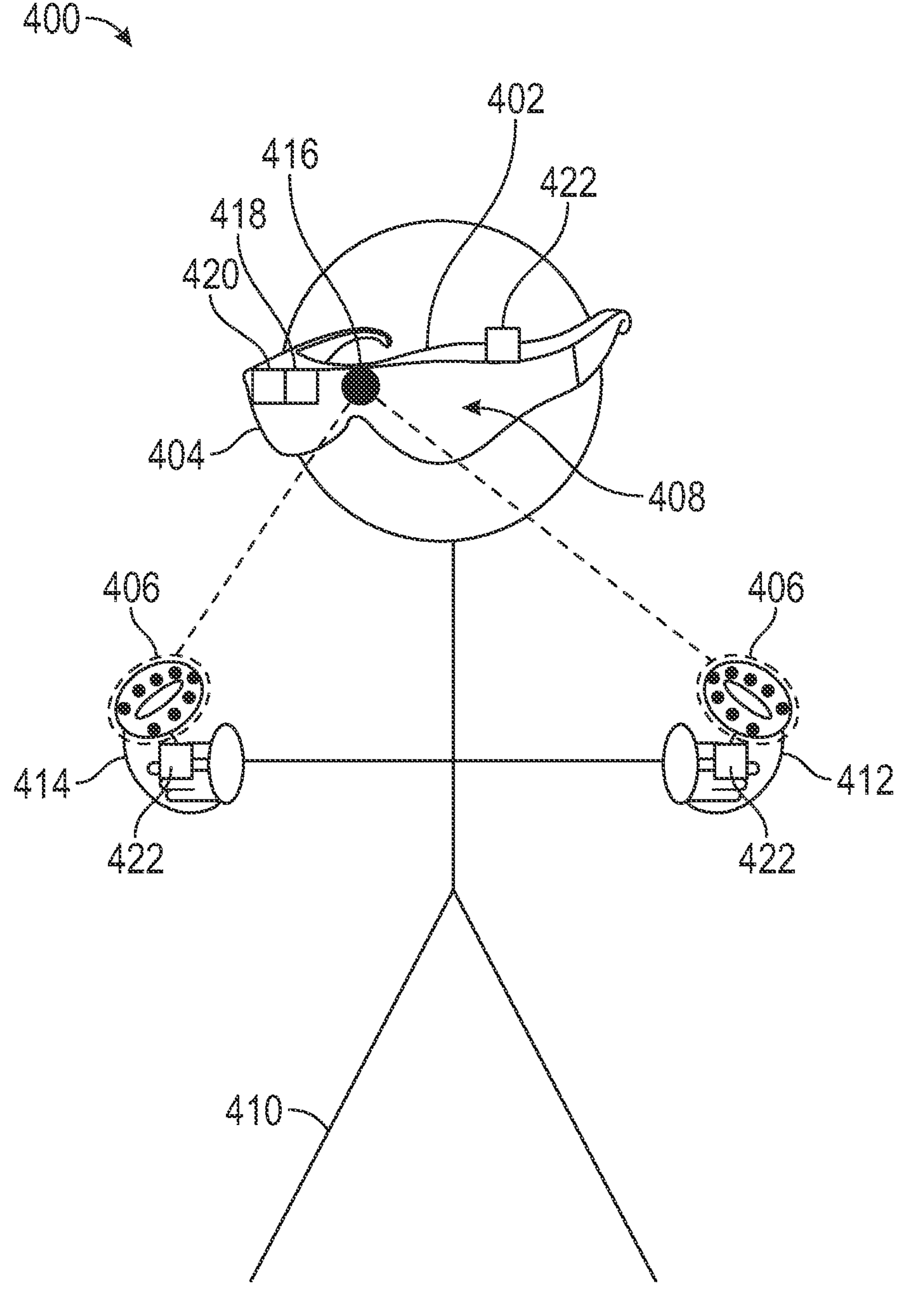
FIG. 4 illustrates an architecture for use of a VR headset including handheld controllers having infrared (IR) beacons for tracking, in accordance with one or more implementations.

FIG. 4 illustrates an architecture 400 for use of a VR headset including handheld controllers having infrared (IR) beacons for tracking, in accordance with one or more implementations. As depicted in FIG. 4, the architecture 400 may include one or more of a headset 402, a frame 404, beacons 406, a display 408, a user 410, an L controller 412, an R controller 414, an IR camera 416, processors 418, memory 420, communications module 422, and/or other components.

The headset 402 may include a frame and a display configured to present a virtual reality environment to a user. The frame 404 may provide structural support for various components of the virtual reality headset. The beacons 406 may emit light to be tracked by cameras to determine the position and orientation of one or more virtual reality controllers (e.g., L controller 412 and R controller 414). The virtual reality controllers may be communicatively coupled with the headset 402. The display 408 may present visual content to the user as part of the virtual reality experience. The user 410 may interact with the virtual reality environment using the controllers. The L controller 412 may be held by the user's left hand and include multiple beacons for tracking. The R controller 414 may be held by the user's right hand and include multiple beacons for tracking. The IR camera 416 may capture images of the beacons to track the position and orientation of the virtual reality controllers. The processors 418 may execute tracking algorithms to determine the orientation, speed, and direction of motion/rotation of each controller. The memory 420 may store tracking algorithms and other data necessary for the operation of the virtual reality headset. The communications module 422 may enable wireless communication between the virtual reality headset and the controllers.

The waveguide within the L controller 412 and R controller 414 may distribute light from a single high-power IR LED to form the beacons 406. The waveguide may be shaped to fit the internal contours of the controllers 412, 414. The indentations and protrusions on the waveguide may direct light to specific locations on the controllers 412, 414, creating the beacons 406 for tracking.

The single high-power IR LED may serve as the primary light source for the beacons 406. The light may be channeled through the waveguide to emerge at the indentations and protrusions. The configuration of the waveguide may allow for a reduction in the number of LEDs required within the controllers 412, 414.

The IR camera 416 may detect the light emitted from the beacons 406 and relay this information to the processors 418. The processors 418 may then determine the position and orientation of the controllers 412, 414 based on the detected light. The memory 420 may store the tracking algorithms that assist the processors 418 in analyzing the data from the IR camera 416.

The communications module 422 may facilitate the exchange of tracking data between the controllers 412, 414 and the headset 402. This data exchange may occur wirelessly, allowing the user 410 to move freely within the virtual reality environment. The communications module 422 may ensure that the tracking data is transmitted in real time to maintain synchronicity between the user's movements and the virtual environment.

Figure 5A:
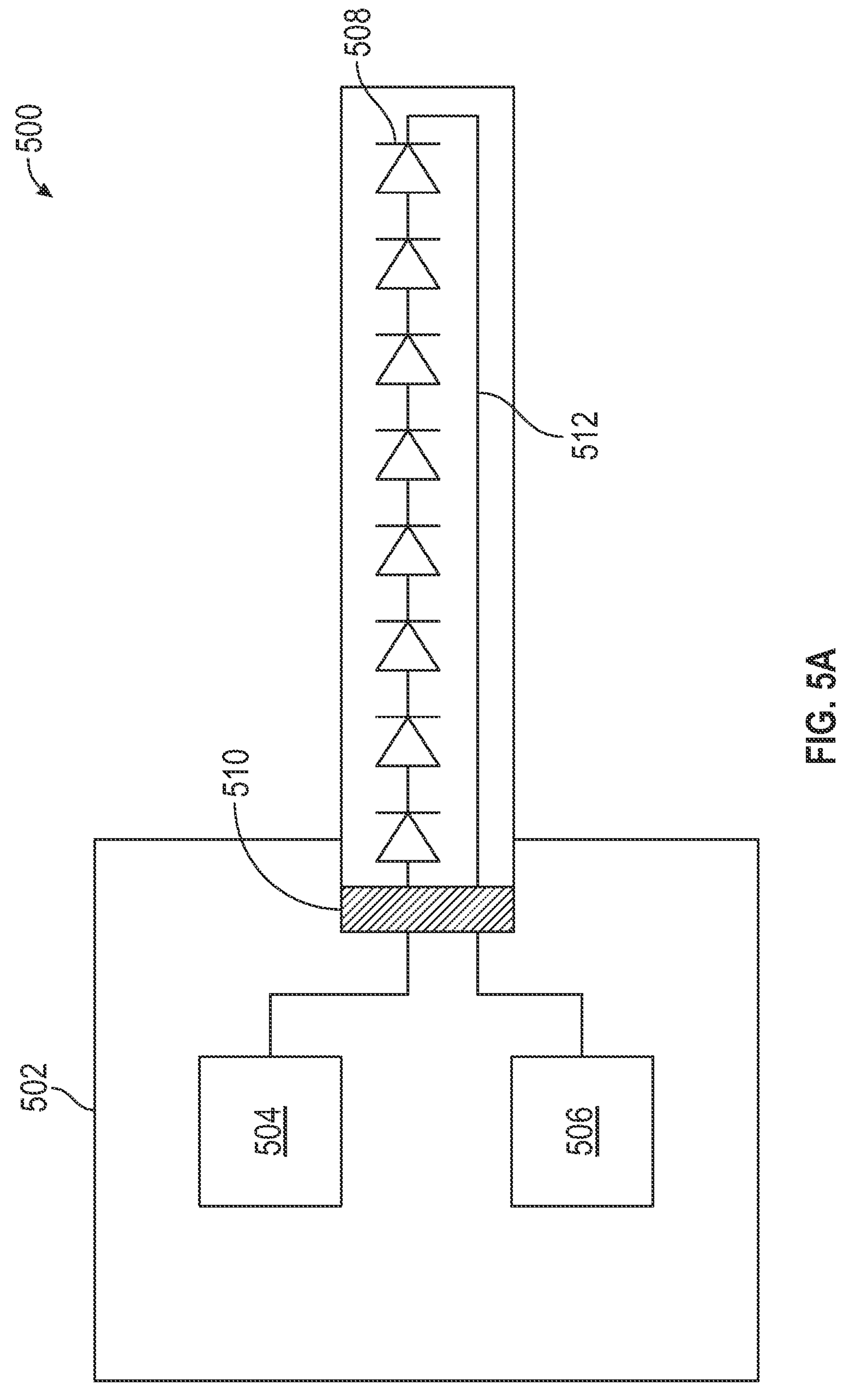
FIG. 5A illustrates an IR-LED string, reflecting a topology including multiple IR-LEDs, a DC-DC boost chip, a current sink chip (to regulate multi-LED current), an LED flex, a connector to connect the LED flex, and several infrared LED light sources, in accordance with one or more implementations.

FIG. 5A illustrates an IR-LED string 500, reflecting a topology including multiple IR-LEDs, a DC-DC boost chip, a current sink chip (to regulate multi-LED current), an LED flex, a connector to connect the LED flex, and several infrared LED light sources, in accordance with one or more implementations. As depicted in FIG. 5A, the IR-LED string 500 may include one or more of a main logic board 502, an IR-LED DC-DC boost chip 504, an IR-LED current sink chip 506, an LED flex 508, a connector 510, multiple infrared LED light sources 512, and/or other components.

The main logic board 502 may serve as the central processing unit for the IR-LED string 500, coordinating the various components and managing data flow. The IR-LED DC-DC boost chip 504 may increase the voltage supplied to the IR-LEDs in the IR-LED string 500 to a level suitable for their operation. The IR-LED current sink chip 506 may regulate the current flowing through the IR-LEDs in the IR-LED string 500 to maintain consistent light output. The LED flex 508 may provide a flexible substrate for mounting the IR-LEDs, allowing the IR-LED string 500 to conform to various shapes within the VR controller. The connector 510 may facilitate the electrical connection between the IR-LED string 500 and other components within the VR controller. The multiple infrared LED light sources 512 may emit infrared light used for tracking the position and orientation of the VR controller.

The IR-LED string 500 includes multiple LED light sources in addition to LED flex, boost and sink chips, which increases the overall cost and complexity of the design. Additionally, the LED flex 508 may be difficult to mount inside compact devices (including controllers), can be easily damaged, and may require a specially designed base to hold it in place.

Figure 5B:
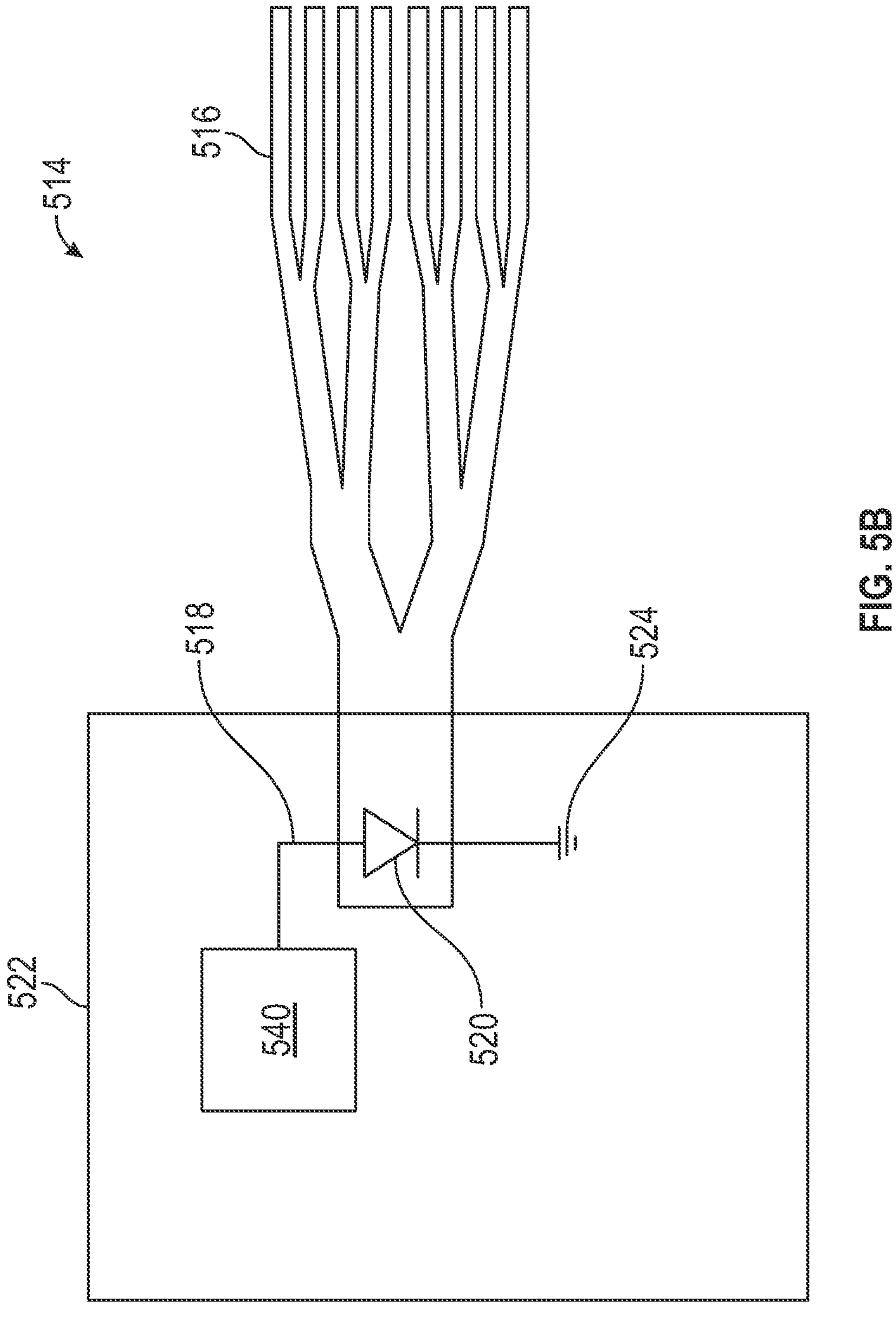
FIG. 5B illustrates an IR-LED configuration having a single IR-LED coupled to a multimode fiber, which in turn is split multiple times to end in a number of end-point fiber ends, each fiber end providing a light output as a beacon for tracking, in accordance with one or more implementations.

FIG. 5B illustrates an IR-LED configuration 514 having a single IR-LED coupled to a multimode fiber, according to one or more embodiments. The multimode fiber is split multiple times resulting in a number of end-point fiber ends, each fiber end providing a light output as a beacon for tracking, in accordance with one or more implementations. The IR-LED configuration 514 may be included in a VR system including, for example, a VR controller and a VR headset. The device may be configured in the VR controller. As depicted in FIG. 5B, the IR-LED configuration 514 may include one or more of an optical fiber 516, an IR LED DC-DC boost 518, a high-power IR LED 520, a main logic board 522, a ground 524, and/or other components.

The optical fiber 516 may serve as a conduit for transmitting light from the high-power IR LED 520 to various locations within the virtual reality controller. By non-limiting example, the optical fiber 516 can conduct the infrared light from the IR LED 520 to the VR system, dividing the light output to the surface of a VR controller of the VR system. This fiber may be composed of a material that facilitates light transmission with minimal attenuation. Due to its flexibility, the optical fiber 516 may be easily integrated into the design of the virtual reality controller. In certain configurations, the optical fiber 516 may lead to multiple endpoints, where each termination acts as a beacon, enhancing the tracking capabilities of the VR system. The IR LED DC-DC boost 518 may elevate the voltage to an optimal level for the high-power IR LED 520 to function efficiently. The high-power IR LED 520 may act as the primary infrared light source within the device, emitting light at a wavelength optimal for detection by the VR headset's camera. The main logic board 522 may constitute the control center of the device, processing data and managing various device functions. The ground 524 may offer a stable reference point for the electrical circuitry, contributing to the device's safety.

Activation of the high-power IR LED 520 may allow for the emission of infrared light, which may be directed through the optical fiber 516 to specific locations where it emerges as beacons. These beacons, visible to the VR headset's camera, may enhance the tracking accuracy of the virtual reality controller. Through careful coordination of the high-power IR LED 520, the IR LED DC-DC boost 518, and the main logic board 522, the device may efficiently manage light emission timing and intensity. The IR-LED configuration 514 saves on cost in the VR system (e.g., from LED flex, connector, and additional infrared LED light sources).

In some implementations, the VR controller may include an activation means (e.g., a button) to activate an input by a user of the VR controller. An activation signal from the activation means may be provided to the virtual reality headset (via, e.g., a communication module of the VR controller).

Figure 6:
FIG. 6 illustrates a light guide configuration using an IR-LED as a light source and a lens for coupling IR-LED light into the light guide, in accordance with one or more implementations.
Figure 6:
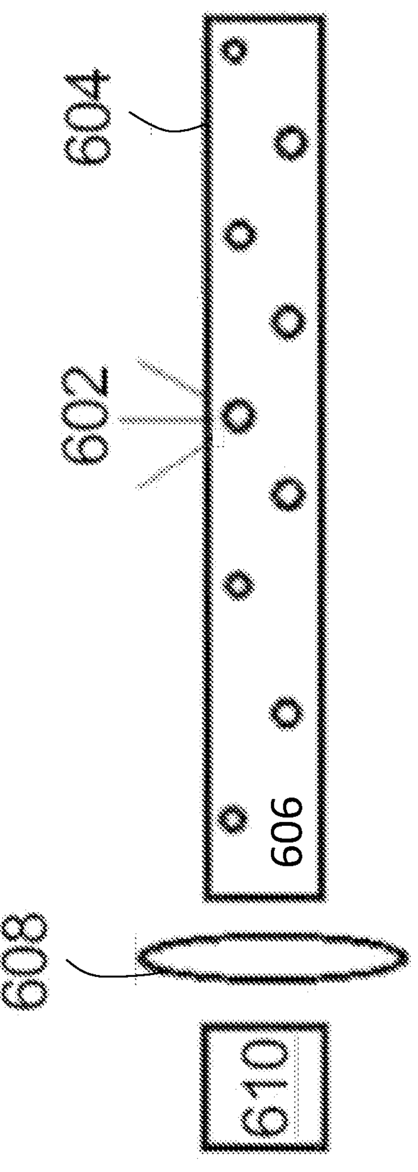

FIG. 6 illustrates a light guide configuration using an IR-LED as a light source and a lens for coupling IR-LED light into the light guide, in accordance with one or more implementations. As depicted in FIG. 6, the LED light guide 600 may include one or more of a light 602, a cave 604, a light guide 606, a lens 608, an LED 610, and/or other components.

The light 602 may be configured to emit infrared light for tracking purposes. The cave 604 may serve as a feature on the surface of the light guide to decouple light. The light guide 606 may be shaped to direct light towards the intended tracking sensors. The lens 608 may focus or disperse the light emitted from the LED into the light guide. The LED 610 may act as the primary source of light for the tracking system.

The LED light guide 600 may operate within a virtual reality system where the light 602 emitted from the LED 610 is directed through the light guide 606. The light guide 606 may channel the light 602 towards the cave 604, which may then allow the light 602 to exit the light guide 606 at predetermined points. The lens 608 may be utilized to ensure that the light 602 enters the light guide 606 with minimal dispersion, maintaining the intensity required for the tracking system to detect the light 602.

The caves 604 may be placed along the light guide 606 to correspond with the field of view of the tracking cameras. The caves 604 may allow the light 602 to emerge as discrete beacons that the tracking system can recognize and use to determine the position and orientation of the VR controllers. The configuration of the caves 604 may be such that they are distributed to provide coverage for various controller orientations.

Figure 7:
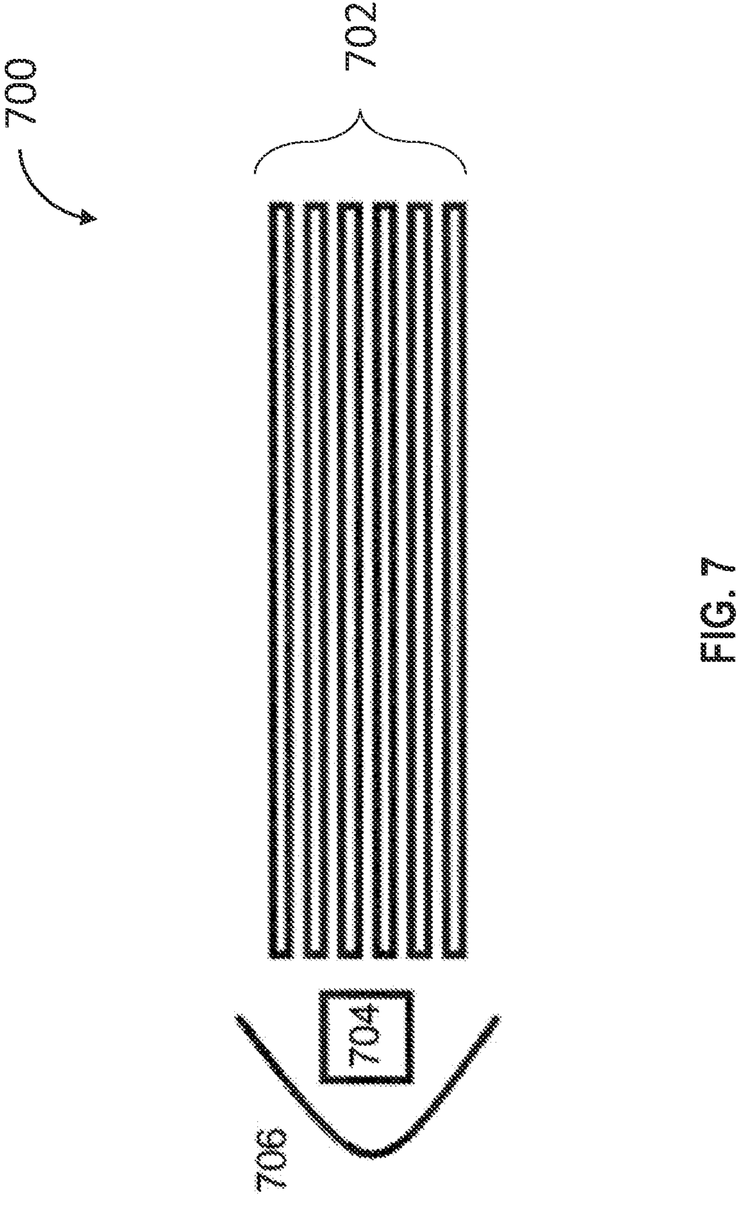
FIG. 7 illustrates a fiber bundle configuration using an IR-LED as a light source and a parabolic mirror for coupling LED light into the fiber bundle, in accordance with one or more implementations.

FIG. 7 illustrates a fiber bundle configuration using an IR-LED as a light source and a parabolic mirror for coupling LED light into the fiber bundle, in accordance with one or more implementations. As depicted in FIG. 7, the LED reflector setup 700 may include one or more of a fiber bundle 702, an LED 704, a reflector 706, and/or other components.

The fiber bundle 702 may be configured to split light into multiple beams directed in different directions. The fiber bundle 702 may include multiple optical fibers that can be shaped to conform to the design of a VR controller. The fiber bundle 702 may distribute light to various points on the controller's surface. The LED 704 may serve as a light source for the fiber bundle 702. The LED 704 may be coupled to the fiber bundle 702 in such a way that it maximizes the efficiency of light transfer into the fibers. The reflector 706 may direct light from the LED 704 into the fiber bundle 702.

The LED reflector setup 700 may operate in conjunction with the VR headset to track the position and orientation of the VR controllers. The light emitted by the LED 704 may be channeled through the fiber bundle 702, which may then emit the light at various points to create a pattern of beacons. These beacons may be detected by cameras in the VR headset, which may determine the controller's location and movements. The configuration of the fiber bundle 702 may allow for a customizable arrangement of beacons to suit different controller designs. The reflector 706 may play a role in ensuring that the light from the LED 704 is efficiently captured and directed into the fiber bundle 702, which may be critical for maintaining a strong signal for the tracking system to detect. The combination of these components may form a system that allows for precise tracking of VR controllers without the need for multiple LEDs and complex wiring, as the single LED 704 and fiber bundle 702 may replace the traditional array of IR beacons.

Figure 8:
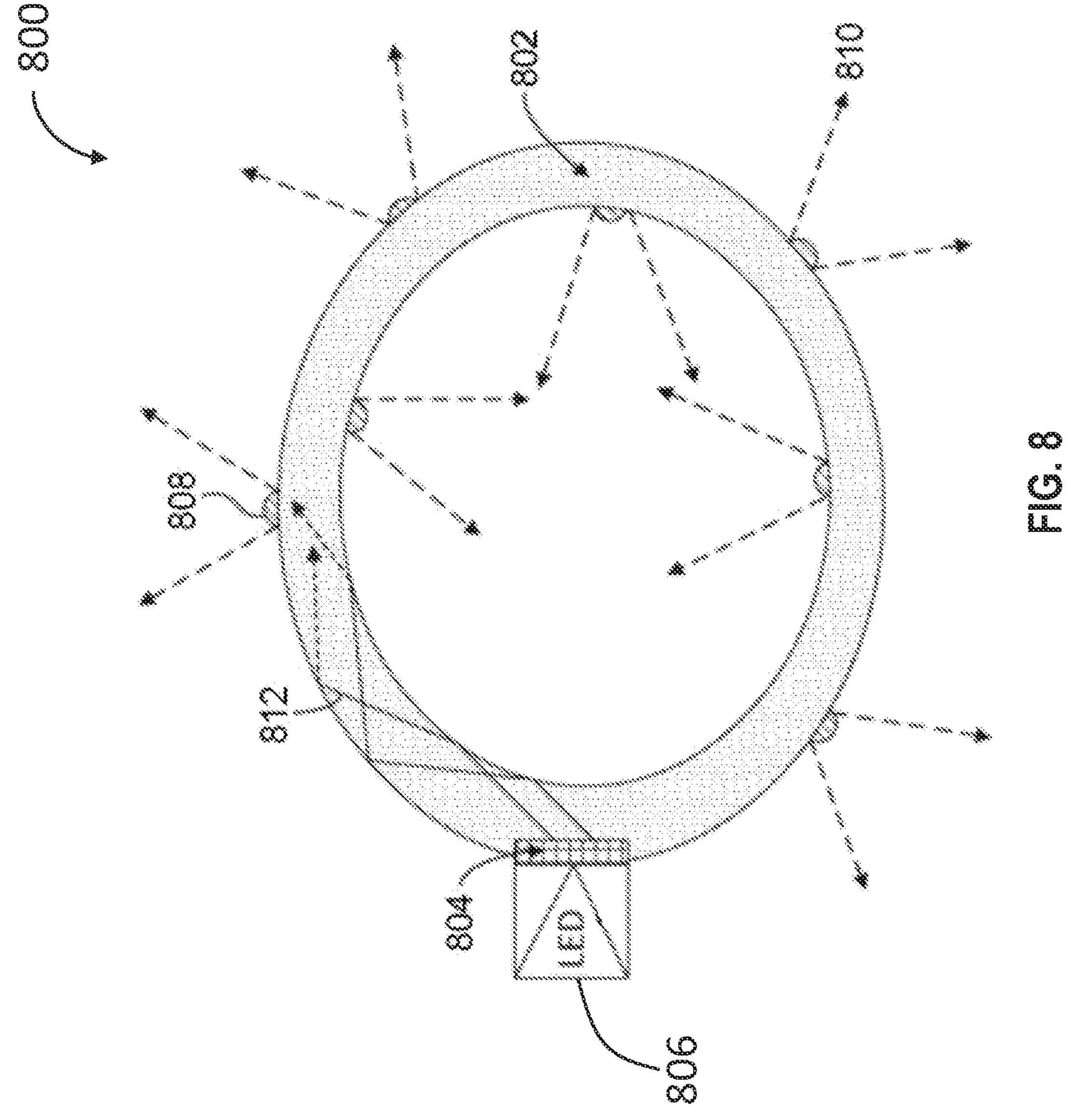
FIG. 8 illustrates a ring-shaped waveguide configuration using an IR-LED as a light source and a surface grating for coupling the LED light into the ring waveguide, in accordance with one or more implementations.

FIG. 8 illustrates a ring-shaped waveguide configuration using an IR-LED as a light source and a surface grating for coupling the LED light into the ring waveguide, in accordance with one or more implementations. As depicted in FIG. 8, the waveguide light configuration 800 may include one or more of a ring waveguide 802, a coupler 804, an LED 806, and/or other components.

The ring waveguide 802 may be shaped to fit within a specific feature of the device and may include multiple indentations on its surface. The ring waveguide 802 may be designed to channel light through its structure. The indentations on the surface of the ring waveguide 802 may act as light-emitting points. These indentations may be strategically placed to ensure light is emitted at specific locations along the ring waveguide 802. An example of the ring waveguide 802 could be a toroidal-shaped waveguide that fits within the circular feature of a virtual reality controller. The coupler 804 may be responsible for efficiently directing light from the LED 806 into the ring waveguide 802. The LED 806 may serve as the primary source of light for the waveguide light configuration 800.

The waveguide light configuration 800 may operate by having the LED 806 emit light (i.e., light in 812) that is directed into the ring waveguide 802 via the coupler 804. The light may then travel through the ring waveguide 802 and be emitted at the indentations to create multiple beacons 808. The emitted light 810 may be detected by cameras in a virtual reality headset to track the orientation and position of the controller. The configuration of the ring waveguide 802 may allow for the precise placement of beacons around the controller's surface. The coupler 804 may ensure that the light in 812 from the LED 806 is efficiently channeled into the waveguide 802 without significant dispersion or loss. The light 810 may be emitted from the ring waveguide 802 in a manner that is detectable by the tracking system of the virtual reality headset. The emitted beacons may provide reference points for the tracking system to accurately determine the controller's movements. The waveguide light configuration 800 may be integrated into the frame of a virtual reality controller, allowing for a compact and streamlined design. The components may work together to create a tracking system that is responsive to the user's movements within the virtual reality environment. The light from the LED 806 may be specifically tailored to be within the infrared spectrum, which may be invisible to the user but detectable by the tracking cameras. The ring waveguide 802 may be customized to fit various shapes and sizes of virtual reality controllers, providing flexibility in design.

Figure 9:
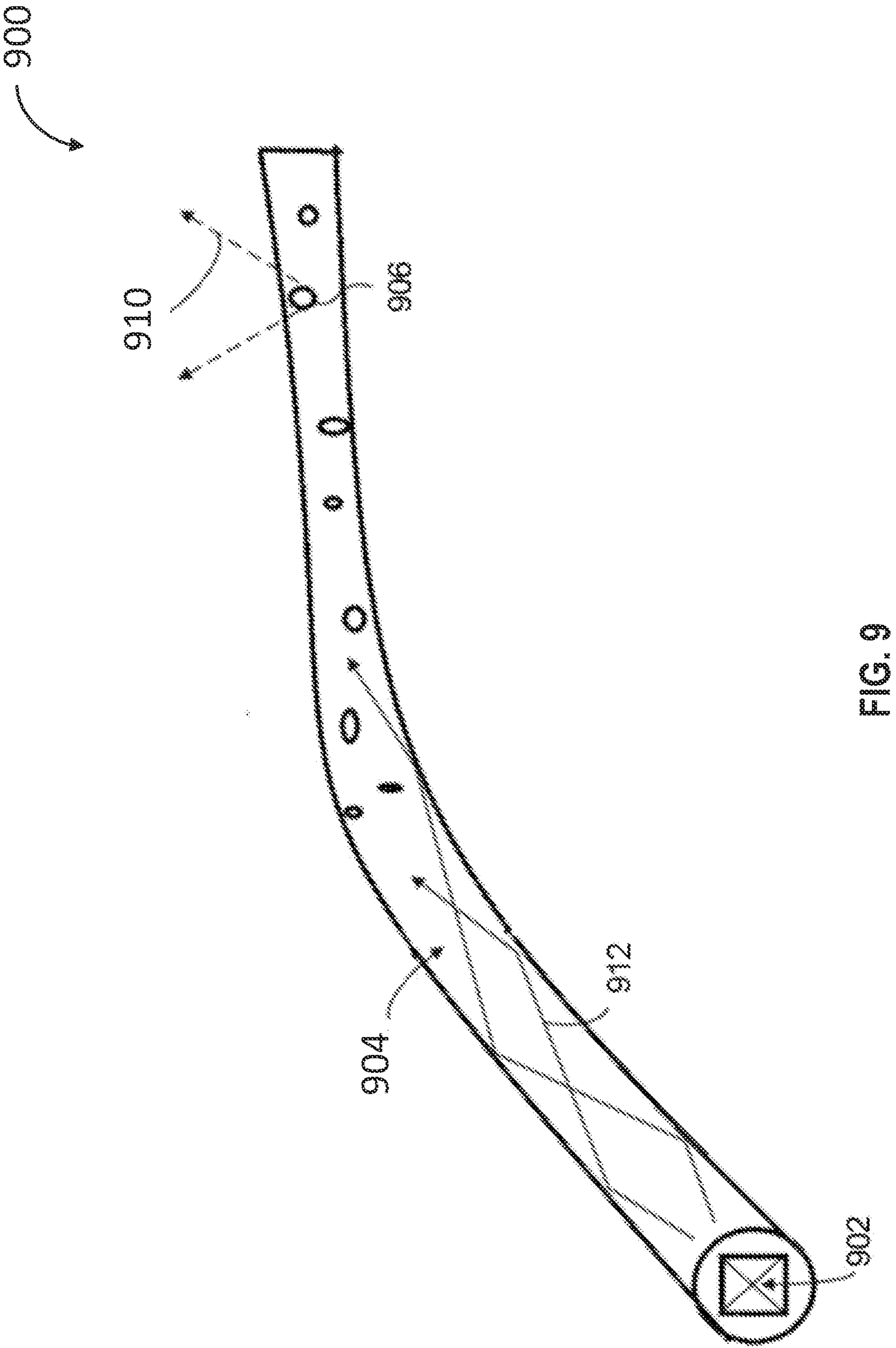
FIG. 9 illustrates a configuration wherein light from an IR-LED is coupled into a cylindrical waveguide having an arbitrary shape, in accordance with one or more implementations.

FIG. 9 illustrates a configuration 900 wherein light from an IR-LED is coupled into a cylindrical waveguide having an arbitrary shape, in accordance with one or more implementations. As depicted in FIG. 9, the waveguide IR beacons of configuration 900 may include one or more of an LED 902, a waveguide 904, beacons 906, and/or other components.

The LED 902 may serve as the primary light source for configuration 900. The waveguide 904 may channel light 912 from the LED 902 to various points of emission. The beacons 906 may emit light 910 at specific locations to facilitate tracking. The beacons 906 may be distributed across the surface of a virtual reality controller to provide multiple points of IR light emission. The optical element that couples light from the LED 902 into the waveguide 904 may be designed to maximize the efficiency of light transfer. The waveguide 904 may be constructed from a material that is highly transparent to infrared light to minimize attenuation as the light travels through the waveguide 904. The configuration of the beacons 906 may be determined by the specific requirements of the tracking system. The number, spacing, and orientation of the beacons 906 may be varied to provide a unique signature that can be easily recognized by the tracking algorithms. The beacons 906 may be strategically placed to remain visible to the tracking cameras even when the controller is moved or rotated.

Figure 10:
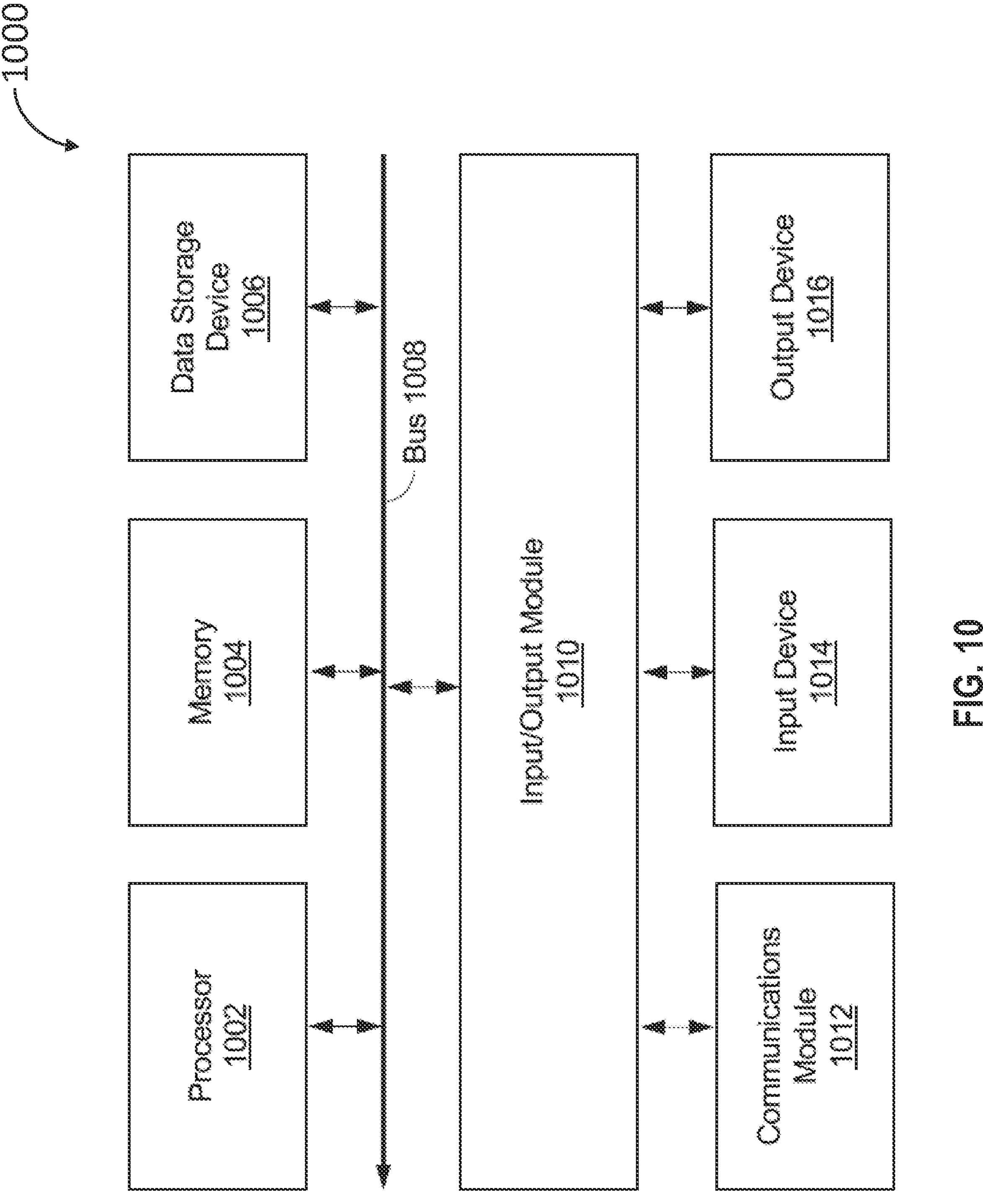
FIG. 10 is a block diagram illustrating an example computer system (e.g., representing both client and server) with which aspects of the subject technology can be implemented.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities.

Computer system 1000 (e.g., server and/or client) includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described gaming systems can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1000 reads game data and provides a game, information may be read from the game data and stored in a memory device, such as the memory 1004. Additionally, data from the memory 1004 servers accessed via a network the bus 1008, or the data storage 1006 may be read and loaded into the memory 1004. Although data is described as being found in the memory 1004, it will be understood that data does not have to be stored in the memory 1004 and may be stored in other memory accessible to the processor 1002 or distributed among several media, such as the data storage 1006.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A device including:

a light emitting diode;

a waveguide formed within a frame of the device for a virtual reality headset; and an optical element configured to couple a light from the light emitting diode into the waveguide, wherein the waveguide is configured to emit at least a portion of the light out of the waveguide as multiple beacons for tracking an orientation and a displacement of the device.

2. The device of claim 1, wherein a distal end of the optical element is mounted to a surface of the device, wherein the device corresponds to a virtual reality controller communicatively coupled to the virtual reality headset.

3. The device of claim 1, wherein the waveguide is a multimode optical fiber that splits one or more times into multiple fibers, and wherein an end point of each of the fibers is directed in a different direction at a different point within the device.

4. The device of claim 1, wherein the waveguide includes a bundle of multiple fibers and the optical element is a parabolic mirror facing the bundle with the light emitting diode disposed at a focal point of the parabolic mirror, facing the parabolic mirror, and wherein an end point of each of the fibers in the bundle is directed in a different direction at a different point within the device.

5. The device of claim 1, wherein the waveguide has a cylindrical shape elongated along a feature of the device, wherein an outer surface of the cylindrical shape has multiple indentations to form the beacons for tracking the orientation and the displacement of the device.

6. The device of claim 1, wherein the optical element is a surface grating formed on the waveguide, the waveguide has a toroidal shape to fit within a circular feature of the device, and the surface of the waveguide has multiple indentations to form the beacons for tracking the orientation and the displacement of the device.

7. The device of claim 1, wherein the light emitting diode is configured to generate an infrared light that is not visible by a user of the virtual reality headset.

8. The device of claim 1, wherein the waveguide includes multiple indentations in an outer surface of the waveguide to form the beacons, further wherein the indentations include one of a concavity or a convexity of the outer surface having a radius of curvature smaller than a radius of curvature of the outer surface.

9. The device of claim 1, wherein the waveguide includes multiple surface spots configured to scatter the light inside the waveguide out of the waveguide, to form the beacons.

10. The device of claim 1, which is a tool for a user of the virtual reality headset in a virtual reality environment, and the waveguide is disposed along the tool.

11. The device of claim 1, further including:

an accelerometer mounted on the frame to determine an orientation of a controller relative to a vertical direction; and a communications module to provide the orientation of the controller to the virtual reality headset.

12. The device of claim 1, wherein at least one of the beacons is visible to the virtual reality headset.

13. The device of claim 1, wherein the beacons are configured to emit infrared light with a numerical aperture that is no less than a numerical aperture of a camera in the virtual reality headset, the camera configured to collect an image of one or more beacons.

14. A controller for a user interface in a virtual reality headset, comprising:

a handling feature to provide a grip for a user of the virtual reality headset;

a frame to support multiple beacons for tracking the controller by the virtual reality headset; and a device that includes the beacons within the frame, wherein the device includes a light emitting diode, a waveguide, and an optical element configured to couple a light from the light emitting diode into the waveguide, and wherein the waveguide is configured to emit at least a portion of the light out of the waveguide as the beacons for tracking an orientation and a displacement of the controller.

15. The controller of claim 14, wherein a distal end of the optical element is mounted to a surface of the controller.

16. The controller of claim 14, wherein the waveguide is a multimode optical fiber that splits one or more times into multiple fibers, and wherein an end point of each of the fibers is directed in a different direction at a different point within the controller.

17. The controller of claim 14, wherein the waveguide includes a bundle of multiple fibers and the optical element is a parabolic mirror facing the bundle with the light emitting diode disposed at a focal point of the parabolic mirror, facing the parabolic mirror, and wherein an end point of each of the fibers in the bundle is directed in a different direction at a different point within the controller.

18. The controller of claim 14, wherein the waveguide has a cylindrical shape elongated along a feature of the device, wherein an outer surface of the cylindrical shape has multiple indentations to form the beacons for tracking the orientation and the displacement of the device.

19. The controller of claim 14, wherein the optical element is a surface grating formed on the waveguide, the waveguide has a toroidal shape to fit within a circular feature of the device, and the surface of the waveguide has multiple indentations to form the beacons for tracking the orientation and the displacement of the device.

20. The controller of claim 14, further comprising:

an accelerometer mounted on the frame and configured to determine the orientation of the controller relative to a vertical direction; and a communications module configured to provide the orientation of the controller to the virtual reality headset.

* * * * *